US009483241B2

(12) United States Patent
Peng et al.

(10) Patent No.: US 9,483,241 B2
(45) Date of Patent: Nov. 1, 2016

(54) METHOD RANKING BASED ON CODE INVOCATION

(71) Applicants: Yang Peng, Shanghai (CN); Xia Yu, Shanghai (CN); Yuna Hou, Shanghai (CN); Ramana Krishna Bhagavatula, San Ramon, CA (US); Jie Zhang, Shanghai (CN)

(72) Inventors: Yang Peng, Shanghai (CN); Xia Yu, Shanghai (CN); Yuna Hou, Shanghai (CN); Ramana Krishna Bhagavatula, San Ramon, CA (US); Jie Zhang, Shanghai (CN)

(73) Assignee: SUCCESSFACTORS, INC., South San Fancisco, CA (US)

(*) Notice: Subject to any disclaimer, the term of this patent is extended or adjusted under 35 U.S.C. 154(b) by 0 days.

(21) Appl. No.: 14/578,183

(22) Filed: Dec. 19, 2014

(65) Prior Publication Data
US 2016/0179487 A1    Jun. 23, 2016

(51) Int. Cl.
*G06F 9/44* (2006.01)
*G06F 9/45* (2006.01)

(52) U.S. Cl.
CPC .................................. *G06F 8/443* (2013.01)

(58) Field of Classification Search
None
See application file for complete search history.

(56) References Cited

U.S. PATENT DOCUMENTS

2015/0143339 A1* 5/2015 Rajanna .................... G06F 8/43
717/123

* cited by examiner

*Primary Examiner* — Qamrun Nahar
(74) *Attorney, Agent, or Firm* — Horizon IP Pte. Ltd.

(57) ABSTRACT

Disclosed herein is a framework for analyzing and determining the impact and importance of software code or method changes. In accordance with one aspect, invocations of methods are tracked by generating marking records. The marking records may be used to rebuild a call stack, which can be used to organize the methods to generate a calling dependency representation. The methods may then be ranked based on such calling dependency representation.

17 Claims, 4 Drawing Sheets

METHOD RANKING BASED ON CODE INVOCATION

TECHNICAL FIELD

The present disclosure relates generally to ranking software code that is used by various parties.

BACKGROUND

For software development, integration and maintenance, there can be multiple users (e.g., programmers, developers, etc.) who create and change the software code. Such code may also be referred to as methods. Certain code or methods may be more important than others. For example, certain methods may be invoked or called more frequently than other methods, and have a greater importance.

Developers and users cannot efficiently analyze all the code or methods, especially for complicated and large software systems. In many instances, users and developers may have to rely on intuition as to the importance of particular codes or methods. This may be an inefficient and inconsistent implementation.

When the software system is released and maintained, changes to the code or method may occur. When codes or methods change, there can be a minor or major impact upon users and developers. It is helpful to users and developers to know which methods and codes have a greater importance, such that when a method or code changes, users and developers would know whether action is needed or not, or if action can be delayed.

SUMMARY

Disclosed herein is a framework for analyzing and determining the impact and importance of software code or method changes. In accordance with one aspect, invocations of methods are tracked by generating marking records. The marking records may be used to rebuild a call stack, which can be used to organize the methods to generate a calling dependency representation. The methods may then be ranked based on such calling dependency representation.

With these and other advantages and features that will become hereinafter apparent, further information may be obtained by reference to the following detailed description and appended claims, and to the figures attached hereto.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

In the description the terms code and method are interchangeable. Code or method describes a tangible piece of software or software listing that is a distinct or different component. Different components (i.e., code or method) may make up a larger software system, be used by different software systems, and/or implemented as a standalone software component. In the exemplary scenarios discussed below, multiple users may use the codes or methods. Furthermore, other codes or methods may call or invoke particular codes or methods.

Codes or methods may be categorized into classes and in certain implementations, classes may also be ranked. Codes or methods may be ranked regardless of which class or classes they belong to. Ranking of codes or methods provides an indication of their importance or usage. Whenever code changes, the ranking of the particular code or method provides an insight as to the importance of such a code or method and the impact of such a code or method.

For developers or users, call history may be available as to which methods call other methods, and the frequencies of such calls. For quality control or assurance users, the ranking of methods provides a tool to properly account for the impact of code change. Therefore, given the ranking of a method, a developer or user may be more or less inclined to modify the code while considering the code's impact or importance. Furthermore, software integration is facilitated by knowing the impact or importance of the code as it relates to other codes or methods.

Figure 1:
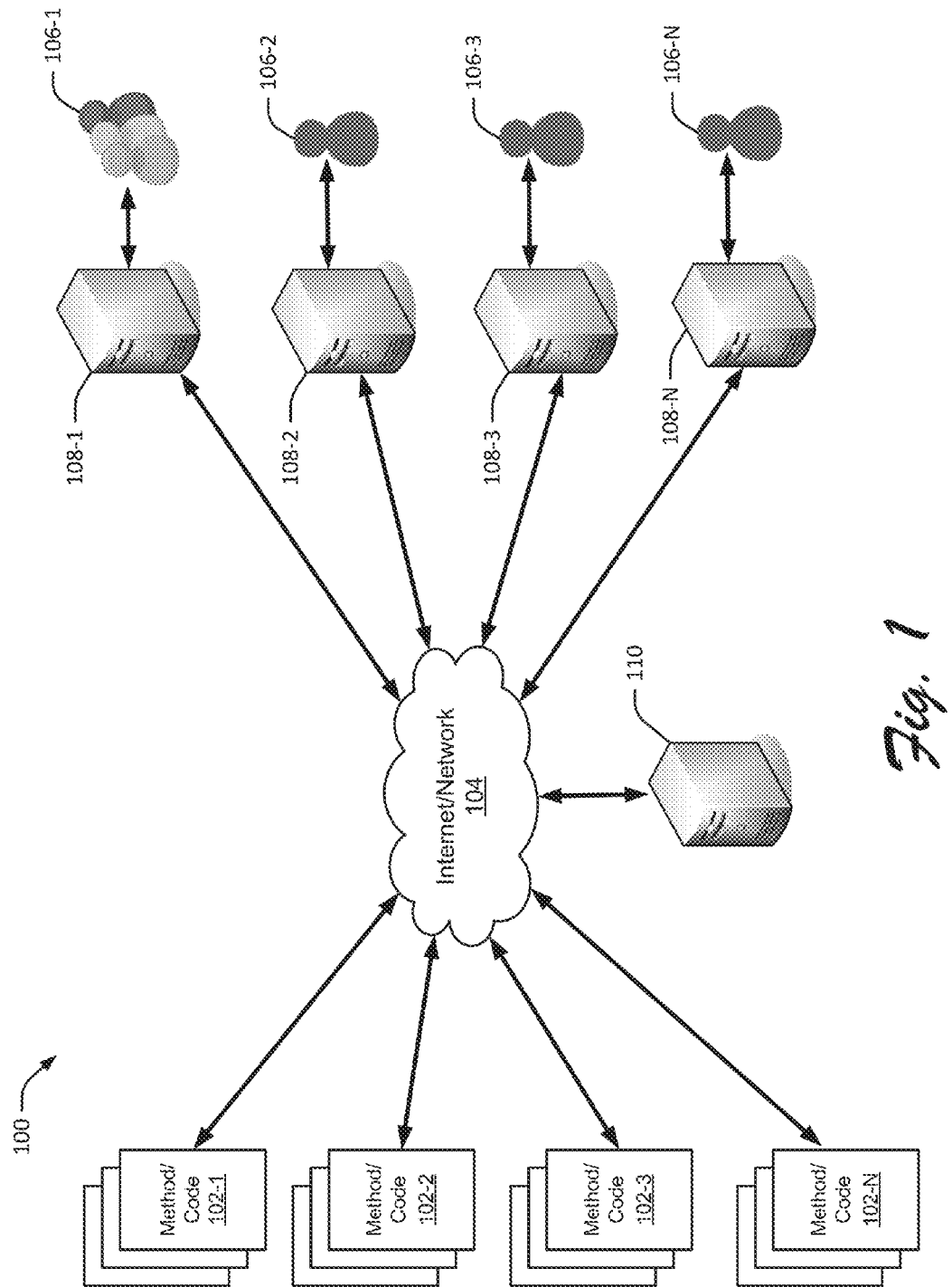
FIG. 1 illustrates an exemplary network or system.

FIG. 1 shows an example system 100 as described in the present implementations herein. It is to be understood, that system 100 may include other devices, components, entities, and the like which are not shown in order to simplify the description.

System 100 includes various methods or codes 102. The methods or codes 102 may be part of a larger system or software program. In certain implementations, methods or codes 102 are stored together or stored separately. It is to be understood that it does not matter where such methods or codes 102 are stored or located; however, the methods or codes 102 may have access to or implement the use of one another. A network or networks 104, such as the Internet, connects to the methods or codes 102. The network 104 is connected to various entities.

In this example, multiple users 106 are connected to the network 104 through respective computing devices, such as servers 108. Users 106 may be a group, or a single individual as shown in FIG. 1. A standalone server or computing device 110 may be implemented. Server 110 may store ranking of methods or codes, and may also store the actual methods and codes 102. It is to be understood that different implementations may be used for storage, access, and integration of software codes and methods.

In an exemplary scenario, a developer amends a method A to add logical processing. The developer can determine if method A is being called by other methods (downstream methods). By doing so, the developer may be able to see several (e.g., hundreds of) methods that call method A, and can determine the context in which method A is used, identify any needed fixes and capture any integration issues.

In another exemplary scenario, after a developer changes a method, a quality assurance (QA) entity desires to test the code or method. The QA entity finds several (e.g. hundreds of) methods that call method A. Based on the ranking of the methods that call method A, the QA entity is able to identify the most used methods.

By ranking the methods against one another, calling integration may be easily performed. For example, impacted or affected methods and their recursive downstream (called) methods may be pulled to perform additional analysis. This may provide the accuracy for QA to reduce regression and integration efforts. Since the calling points are known, the QA may use this knowledge to perform tests that target the impacted methods. Furthermore, ranking of methods allows the ability to prioritize testing of methods.

From call history, impacted methods and their recursive downstream (called) methods may be pulled or determined for further analysis. This may be helpful for software module developers, especially during software integration.

Certain algorithms may be used to rank methods with one another. For example, invocation based on call stacks may be implemented. In particular, ranking is based on the invocation or calling of the method by another method. The following is an example of such an algorithm.

In order to perform invocation tracking, marking of each method may be performed (dynamically) at code level or byte code level. For purposes of illustration, the following implementation is described in the context of code level markers. A marker is a function or routine that generates a marking record that may be used to rebuild a method call stack. For example:

Calling marker:
If method A calls method B, it should invoke the calling marker before the actual call of method B The calling marker may not provide sufficient information, since it does not know which class it is calling. The class may be an interface, proxy, or even a function object in some languages. Therefore, the following may be implemented:

Beginning marker:
In every method, the first instruction is the beginning marker, indicating the method is beginning
Exiting marker:
In every method, before any throw exception or return statement (even it is declared as void returned), it should call the exiting marker Accordingly, each method may have one beginning marker, one or more calling markers (if the method calls other methods), and one or more exiting markers (depending on how many throw or return statements the method has).

An exemplary code listing is as follows:

```
Public Integer Method_A (para1, para2){
    Beginning_Marker ("Method_A");  // set a beginning
                                    marker indicating this method
                                    is just being called
    Program logic .....
    Calling_Marker("Method_A"); // set a calling marker to indicate
                                 method A will be calling another method
    Method_B( );
    If(conditions)
        Exiting_Marker("Method_A"); // set exiting marker before
                                     throwing an exception
        Throw new Exception;
        Exiting_Marker("Method_A"); // exit marker before any
                                     return statement
        Return;
}
```

Based on the marker records that are generated per execution thread, the call stack (or execution stack) may be rebuilt. A call stack is a stack data structure that stores information about the active subroutines of the computer program. The call stack may be rebuilt based on a predetermined rule that each method should have a begin marking record and end marking record generated by the method's beginning and exiting markers. However, due to an unexpected exception or bad coding style, there may be multiple end marking records or no end marking records for one method. In other words, a method determines the exception thrown by the method; however, the calling stack can still be built correctly. Thread marker records may look like the following example.

Method A Begins
　Method A Calling
　Method B Begins
　Method B Calling
　Method C Begins
　Method C ends
Method A Ends Since there is no end marker for method B, there is an indication that something happened during execution of method B, where the exiting marker did not have a chance to be invoked. However, there is a "Method B Calling" marker, which indicates the Method C is called by Method B, not Method A. In this instance, the call stack or sequence is A→B→C, not A→B, C. Therefore, a call stack may be built correctly with these three exemplary types of markers.

Figure 2:
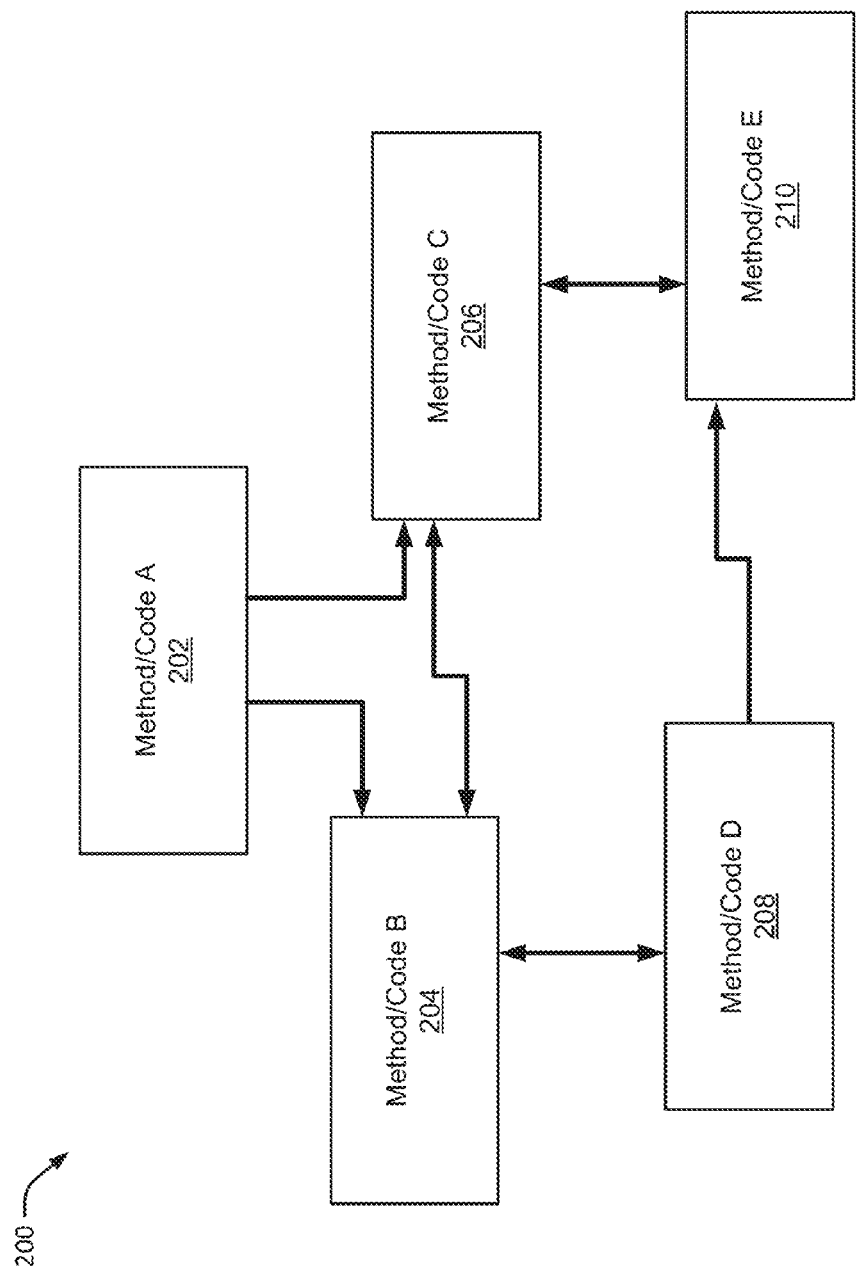
FIG. 2 illustrates an exemplary calling dependency map.

In some implementations, the call stack is used to generate a calling dependency map. FIG. 2 shows an exemplary calling dependency map 200. The calling dependency map 200 represents calling dependencies between method or code A 202, method or code B 204, method or code C 206, method or code D 208, and method or code E 210. For example, if method or code A 202 calls method or code B 204, method or code A 202 depends on method or code B 204. Therefore, method or code B 204 is considered important to method or code A 202. For recursive methods (i.e., methods calling themselves), the situation may be considered a self-link. Therefore, such methods may be removed from the call map.

The methods or codes may then be assigned ranking scores based on the calling dependency map. Initially, all methods may be designated with the same score (e.g., 10). Based on the calling dependency map, this score may be distributed by following predefined rules:

If method or code A 202 calls methods ($M_1$-$M_n$) during implementation, method or code A 202 may distribute its score to all those dependent methods based on following formula:

$M_a$: Method A
$M_x$: current depend method X (0-n)
Score($M_x$): new score for Method X
Old_score($M_x$): original score for method
Factor: based on the system status: normally take 0.72 (may be adjusted based on need)

$$score(M_x) = old\_score(M_x) + score(M_a)$$
$$* factor * old\_score(M_x) / E_{i=0}^n old\_score(Mi)$$

This iteration continues until all methods have been covered, and the scores or rankings become stabilized. At the end, all methods are rated with proper ranking scores based on the calling history.

It should be appreciated that if the software code or functions are not executed, it may not be possible to measure the score since static code does not have any calling dependency. For different modules and different usages, multiple calling dependency maps are derived. The methods or codes may be re-ranked based on different modules' usage (i.e., merged maps).

The ranking may be performed for a certain scope or local area of the entire software project. For example, the ranking may be performed for certain code base, certain usages, etc. A team responsible for developing a particular feature of the project may conduct certain area testing, and limit calling dependency to that code area accordingly.

Figure 3:
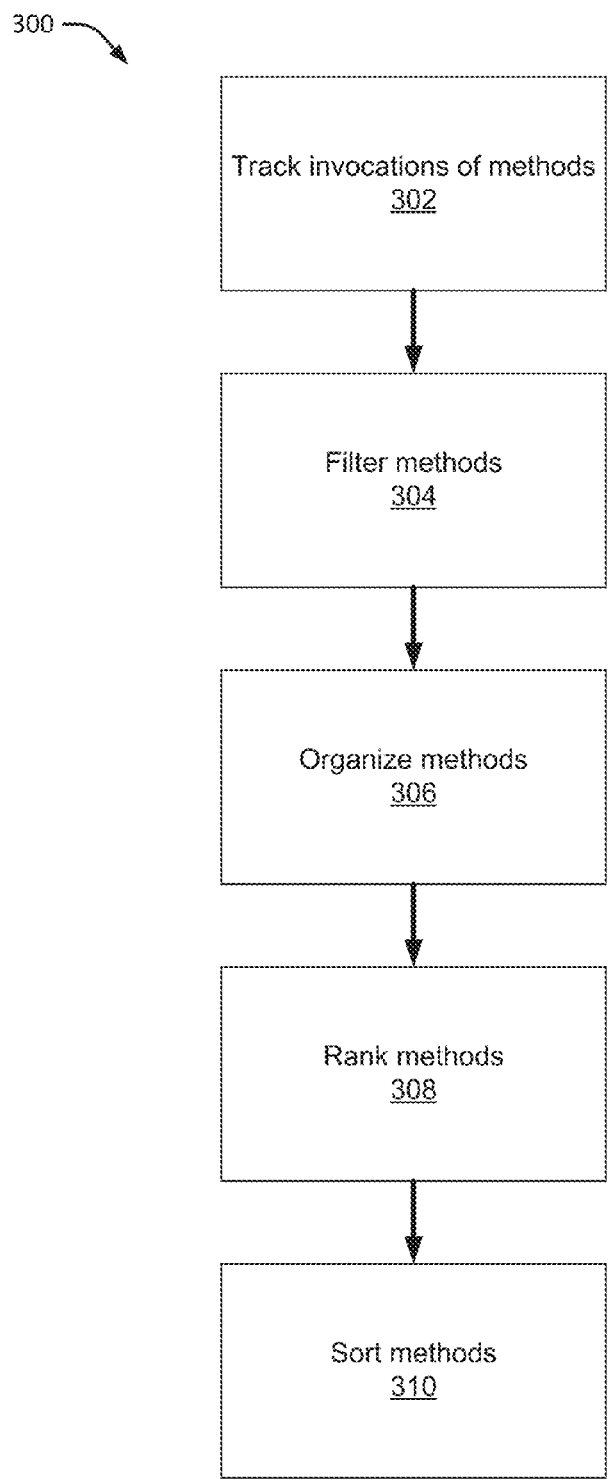
FIG. 3 illustrates an exemplary process for ranking methods based on invocation.

FIG. 3 shows an exemplary process 300 for implementing, at least in part, the technology described herein. In particular, process 300 depicts a flow to rank methods based on invocation. The process 300 may be performed by a computing device. An example architecture of such a computer device is described below with reference to FIG. 4.

At 302, invocations of methods or codes are tracked. In certain implementations, the methods or codes are invoked by executing user scenarios and/or tests. The tracking may be performed by marking each method or code using multiple markers (e.g., calling marker, beginning marker, exiting marker, etc.). As described previously, the markers may be invoked to generate marker records for each execution thread. The marker records may then be used to rebuild the call stack. For example, call stacks with detailed method names and parameter types may be collected.

At 304, filtering of methods or codes is performed. Any unimportant methods or codes may be removed. This may be from predetermined lists or analytically performed by one or more entities. In certain implementations, a previously ranked list of methods is used to determine the most and least important methods.

At 306, organizing of the methods or codes is performed. The organizing may be based on call history of methods running the software code. More particularly, the methods or codes may be organized into a calling dependency representation (e.g., map) based on the re-built call stack. The methods may also be organized based on type and class.

At 308, ranking of the methods or codes is performed. The methods or codes may be ranked based on the calling dependency representation. Initially, all methods in the map may be assigned the same initial rank score. Each method in the calling dependency representation may then redistribute its assigned rank score to those methods dependent on it. For example, the score may be based on the following: if method A calls methods B, C and D, then method A may assign a certain score to methods B, C and D, such as one third (⅓) the score of method A. Method A keeps its own score.

At 310, sorting of the methods or codes is performed. Based on the ranking scores of the methods or codes, complexity of the methods, and/or other factors (external), sorting may be performed. The results of the method 300 (e.g., sorted methods) may then be presented to a user via, for example, a user interface. The user may use the results to, for example, analyze code change impact, conduct integration testing, etc.

Figure 4:
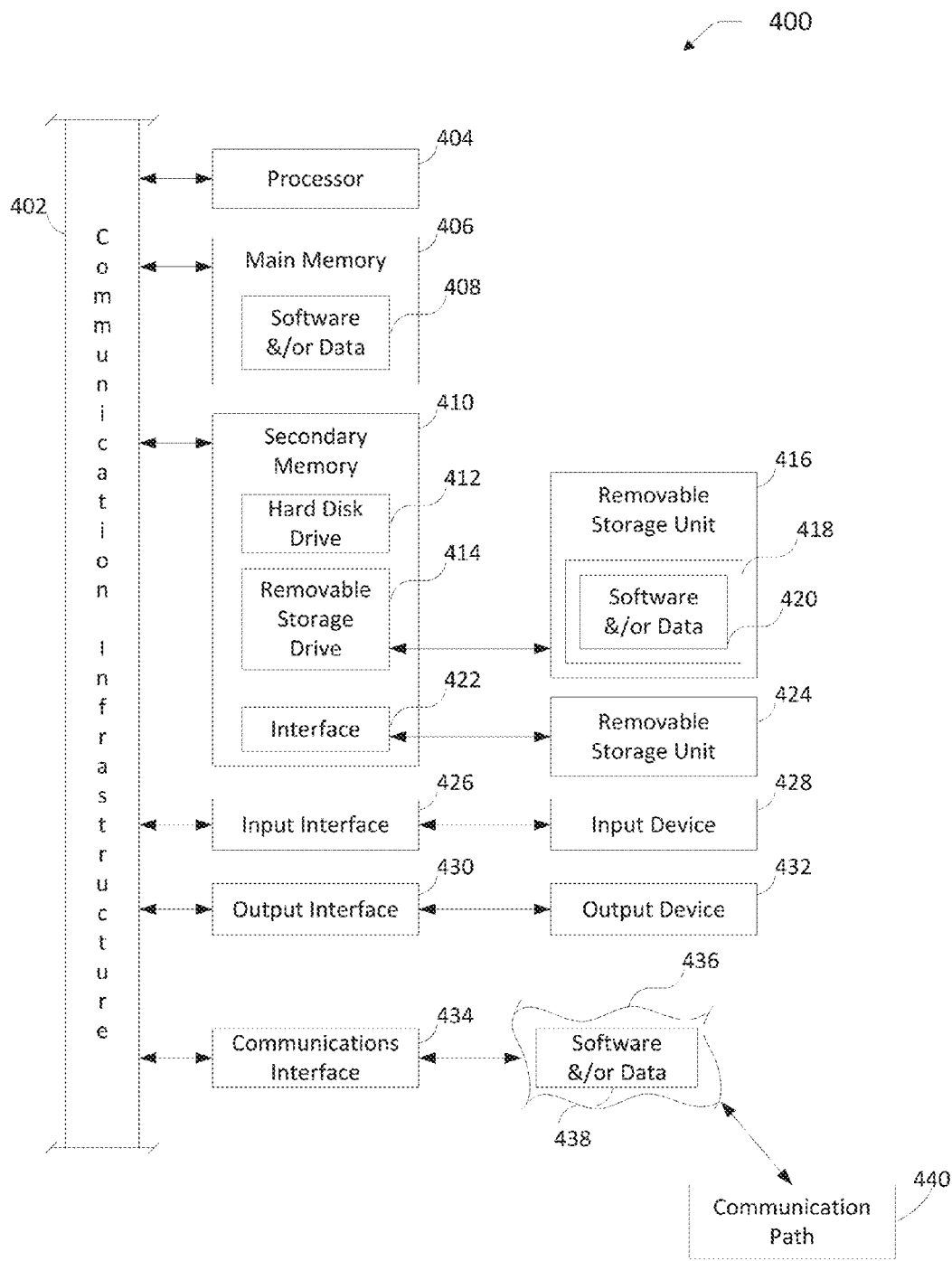
FIG. 4 illustrates an exemplary computing system to implement the technologies described herein.

FIG. 4 illustrates an exemplary system 400 that may implement, at least in part, the technologies described herein. The computer system 400 includes one or more processors, such as processor 404. Processor 404 can be a special-purpose processor or a general-purpose processor. Processor 404 is connected to a communication infrastructure 402 (for example, a bus or a network). Depending upon the context, the computer system 400 may also be called a client device.

Computer system 400 also includes a main memory 406, preferably Random Access Memory (RAM), containing possibly inter alia computer software and/or data 408.

Computer system 400 may also include a secondary memory 410. Secondary memory 410 may include, for example, a hard disk drive 412, a removable storage drive 414, a memory stick, etc. A removable storage drive 414 may comprise a floppy disk drive, a magnetic tape drive, an optical disk drive, a flash memory, or the like. A removable storage drive 414 reads from and/or writes to a removable storage unit 416 in a well-known manner. A removable storage unit 416 may comprise a floppy disk, a magnetic tape, an optical disk, etc., which is read by and written to by removable storage drive 414. As will be appreciated by persons skilled in the relevant art(s) removable storage unit 416 includes a computer usable storage medium 418 having stored therein possibly inter alia computer software and/or data 420.

In alternative implementations, secondary memory 410 may include other similar means for allowing computer programs or other instructions to be loaded into computer system 400. Such means may include, for example, a removable storage unit 424 and an interface 422. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 424 and interfaces 422 which allow software and data to be transferred from the removable storage unit 424 to computer system 400.

Computer system 400 may also include an input interface 426 and a range of input devices 428 such as, possibly inter alia, a keyboard, a mouse, etc.

Computer system 400 may also include an output interface 430 and a range of output devices 432 such as, possibly inter alia, a display, one or more speakers, etc.

Computer system 400 may also include a communications interface 434. Communications interface 434 allows software and/or data 438 to be transferred between computer system 400 and external devices. Communications interface 434 may include a modem, a network interface (such as an Ethernet card), a communications port, a Personal Computer Memory Card International Association (PCMCIA) slot and card, or the like. Software and/or data 438 transferred via communications interface 434 are in the form of signals 436 which may be electronic, electromagnetic, optical, or other signals capable of being received by communications interface 434. These signals 436 are provided to communications interface 434 via a communications path 440. Communications path 440 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 416, removable storage unit 424, and a hard disk installed in hard disk drive 412. Computer program medium and computer usable medium can also refer to memories, such as main memory 406 and secondary memory 410, which can be memory semiconductors (e.g., Dynamic Random Access Memory (DRAM) elements, etc.). These computer program products are means for providing software to computer system 400.

Computer programs (also called computer control logic) are stored in main memory 406 and/or secondary memory 410. Such computer programs, when executed, enable computer system 400 to implement the present technology described herein. In particular, the computer programs, when executed, enable processor 404 to implement the processes of aspects of the above. Accordingly, such computer programs represent controllers of the computer system 400. Where the technology described herein is implemented, at least in part, using software, the software may be stored in a computer program product and loaded into computer system 400 using removable storage drive 414, interface 422, hard disk drive 412 or communications interface 434.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method for ranking software codes, comprising:
    tracking, by a computing device, invocations of software codes by invoking multiple markers to mark the software codes and generate marking records;
    rebuilding, by the computing device, a call stack having a stack data structure, wherein the call stack is rebuilt based on the marking records;
    organizing, by the computing device, the software codes based on the call stack into a calling dependency map; and
    ranking, by the computing device, the software codes based on the calling dependency map, wherein the ranking ranks software codes against one another and redistributes rank scores associated with the software codes in the calling dependency map to other dependent software codes.

2. The method of claim 1 wherein the multiple markers are invoked at byte code level.

3. The method of claim 1 wherein invoking the multiple markers comprises invoking a beginning marker as a first instruction of each of the software codes.

4. The method of claim 1 wherein invoking the multiple markers comprises invoking a calling marker before one of the software codes calls another one of the software codes.

5. The method of claim 1 wherein invoking the multiple markers comprises invoking an exiting marker before any throw exception or return statement.

6. The method of claim 1 wherein invoking the multiple markers comprises invoking a beginning marker, one or more calling markers and one or more exiting markers for each of the software codes.

7. The method of claim 1 wherein the invocations are tracked based on tests of the software codes that are performed in simulated user scenarios.

8. The method of claim 1 further comprising filtering the software codes to remove any unimportant software code.

9. The method of claim 1 wherein rebuilding the call stack comprises determining a call sequence based on a begin marking record and an end or calling marking record associated with each of the software codes.

10. A system comprising:
    a memory device for storing non-transitory computer readable program code; and
    a processor device in communication with the memory device, the processor device being operative with the computer readable program code to perform operations comprising tracking invocations of methods by generating marking records, rebuilding a call stack, wherein the call stack comprises a stack data structure, wherein the call stack is rebuilt based on the marking records, organizing the methods based on the call stack to generate a calling dependency representation, and ranking the methods against one another based on the calling dependency representation, including assigning identical initial rank scores to the methods in the calling dependency representation, and for each of the methods, redistributing the rank score associated with the method to methods that are dependent on the method.

11. The system of claim 10 wherein the marking records are generated by invoking a beginning marker, a calling marker and an exiting marker.

12. The system of claim 10 wherein rebuilding the call stack comprises determining a call sequence based on a begin marking record and an end or calling marking record associated with each of the methods.

13. The system of claim 10 wherein the calling dependency representation comprises a calling dependency map.

14. The system of claim 10 wherein the processor is further operative with the computer readable program code to sort the ranked methods.

15. One or more non-transitory computer-readable media storing processor-executable instructions that when executed cause one or more processors to perform operations that rank methods, comprising:

tracking invocations of methods by generating marking records;

rebuilding a call stack based on the marking records, wherein the call stack comprises a stack data structure;

organizing the methods based on the call stack to generate a calling dependency representation; and ranking the methods against one another based on the calling dependency representation, including assigning identical initial rank scores to the methods in the calling dependency representation, and for each of the methods, redistributing the rank score associated with the method to methods that are dependent on the method.

16. The one or more computer-readable media of claim 15 wherein the marking records are generated by invoking a beginning marker, a calling marker and an exiting marker.

17. The one or more computer-readable media of claim 15 wherein rebuilding the call stack comprises determining a call sequence based on a begin marking record and an end or calling marking record associated with each of the methods.

* * * * *